Nov. 30, 1954  K. D. WOODS  2,695,467
TRACTOR MOUNTED BLADE ATTACHMENT AND
ACTUATING MECHANISM THEREFOR
Filed Dec. 1, 1950  5 Sheets-Sheet 1

Kenneth D. Woods
INVENTOR.

Nov. 30, 1954 K. D. WOODS 2,695,467
TRACTOR MOUNTED BLADE ATTACHMENT AND
ACTUATING MECHANISM THEREFOR
Filed Dec. 1, 1950 5 Sheets-Sheet 4

Kenneth D. Woods
INVENTOR.

BY
Attorneys

Nov. 30, 1954 K. D. WOODS 2,695,467
TRACTOR MOUNTED BLADE ATTACHMENT AND
ACTUATING MECHANISM THEREFOR
Filed Dec. 1, 1950 5 Sheets-Sheet 5

Kenneth D. Woods
INVENTOR.

BY

# United States Patent Office 2,695,467
Patented Nov. 30, 1954

2,695,467

TRACTOR MOUNTED BLADE ATTACHMENT AND ACTUATING MECHANISM THEREFOR

Kenneth D. Woods, Willcox, Ariz., assignor of one-half to R. T. Keener, National City, Calif.

Application December 1, 1950, Serial No. 198,581

14 Claims. (Cl. 37—144)

This invention relates to new and useful improvements in earth pushing and digging devices and the primary object of the present invention is to provide a tractor attachment including a vertically raisable blade situated at the front of the tractor.

Another object of the present invention is to provide a blade attachment for tractors that is quickly and readily applied to or removed from a tractor in a convenient manner.

Another object of the present invention is to provide a tractor blade attachment including forward and rear mountings that will distribute additional weight to the forward and rear wheels of a tractor whereby all wheels of the tractor carrying the attachment will have proper traction and drive.

Another object of the present invention is to provide a tractor attachment including a front frame that is mounted upon the front end of a tractor and which is so constructed and arranged as to protect and shield the radiator of the tractor on which the same is mounted.

Yet another object of the present invention is to provide a tractor blade attachment that is so mounted on a tractor as to permit suitable accessories to be applied, without obstruction, to the tractor.

A further object of the present invention is to provide a blade attachment for tractors including a novel and improved rear mounting assembly to which a vertically swingable lift bar is applied and a cable adjustably secured to the lift bar and connected to a blade at the forward ends of a pair of vertically swingable beams for selectively raising and lowering the lift bar.

A still further aim of the present invention is to provide a tractor attachment of the aforementioned character that is extremely simple and practical in construction and which is actuated by the lift mechanism of a tractor for selectively raising and lowering the blade of the attachment.

Other objects and advantages reside in the details of construction and operation as more fully hereinafter described and claimed, reference being had to the accompanying drawings forming part hereof, wherein like numerals refer to like parts throughout, and in which:

Figure 1:
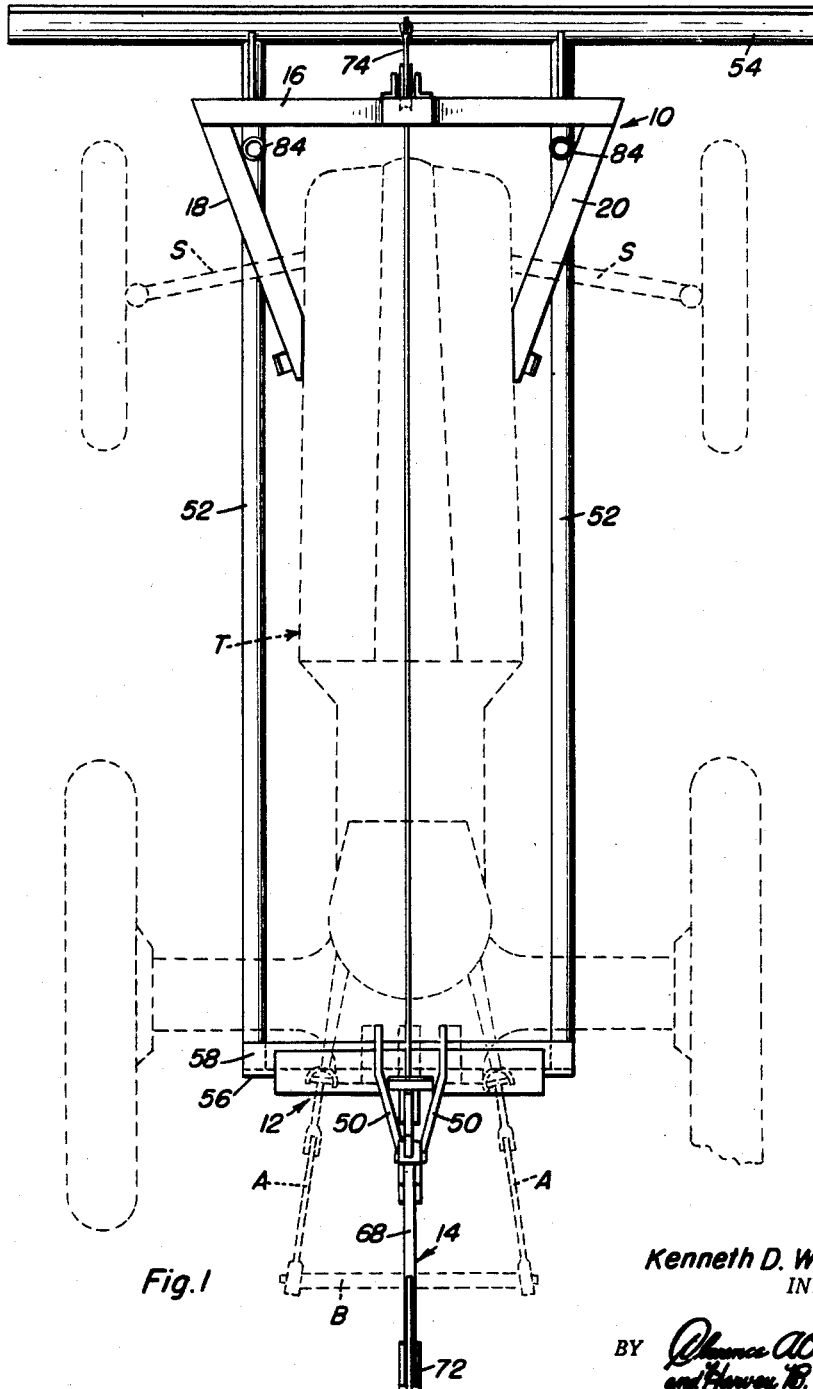
Figure 1 is a top plan view of the present invention mounted on a tractor shown in dotted lines.

Referring now to the drawings in detail, wherein for the purpose of illustration, there is disclosed a preferred embodiment of the present invention, the numerals 10, 12 and 14 represent a front frame, a rear mounting assembly and a blade supporting and lifting structure respectively, each of which will now be described in specific detail.

Front frame

Figure 6:
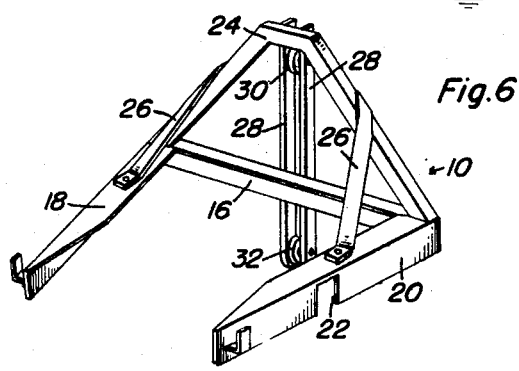
Figure 6 is a perspective view of the front frame per se.

The front frame, designated by the numeral 10 and shown best in Figure 6 is designed and mounted to shield and protect the radiator of the tractor T on which the same is mounted. The front frame 10 includes a transverse angle iron bar 16 to the ends of which is fixed a pair of rearwardly converging angle iron side arms 18 and 20 having notches 22 in their vertical flanges that receive the front wheel supports S of the tractor.

Figure 5:
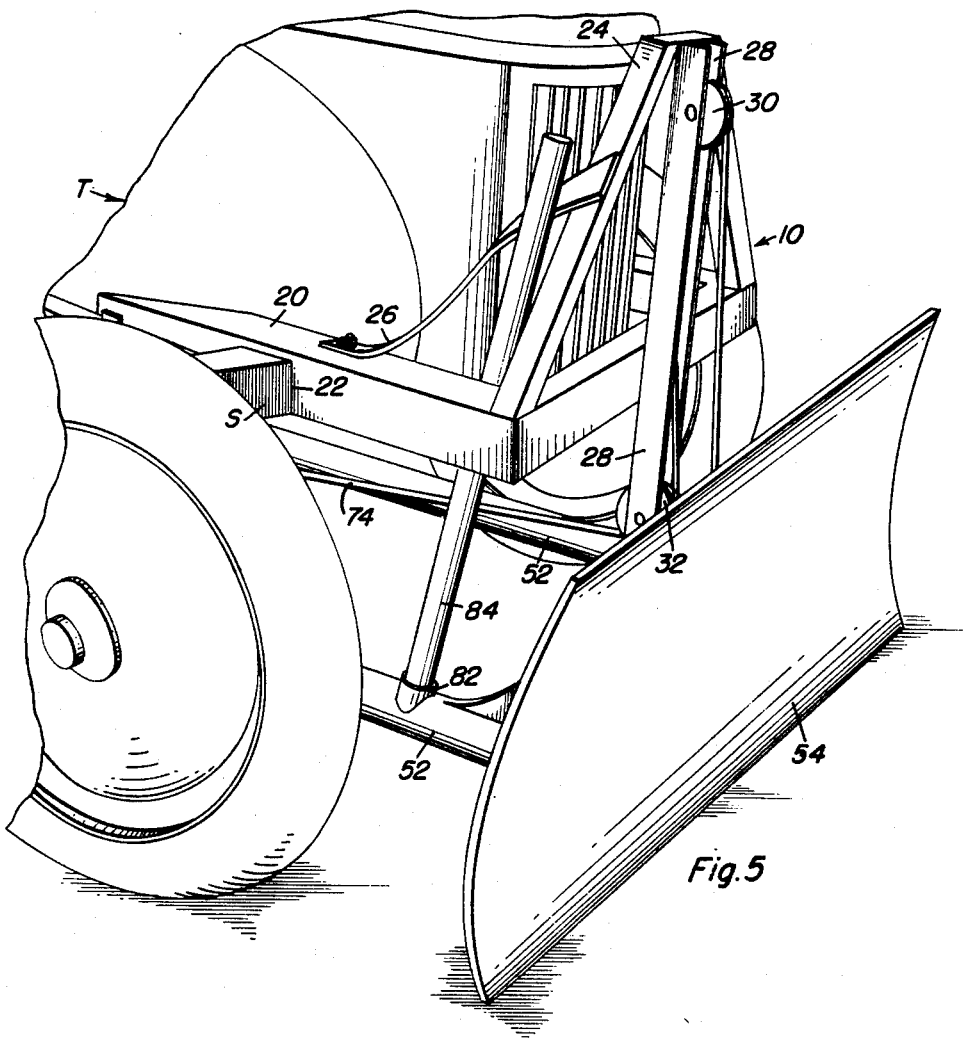
Figure 5 is a fragmentary perspective view of the front of a tractor on which the present invention is mounted to show the front frame portion of the invention.

An inverted substantially V-shaped frame member 24 is fixed to the bar 16 and its legs are braced to the arms 20 by a pair of vertically inclined braces 26 that are terminally secured to the legs of the frame member 24 and the arms 20. The frame member 24 is disposed vertically in front of the tractor's radiator R as illustrated best in Figure 5 of the drawings.

A pair of spaced parallel vertical bars 28 are fixed to the V-shaped frame member 24 and the bar 16 and their upper and lower ends support upper and lower pulleys 30 and 32 for a purpose which will later be more fully described.

Rear mounting assembly

Figure 4:
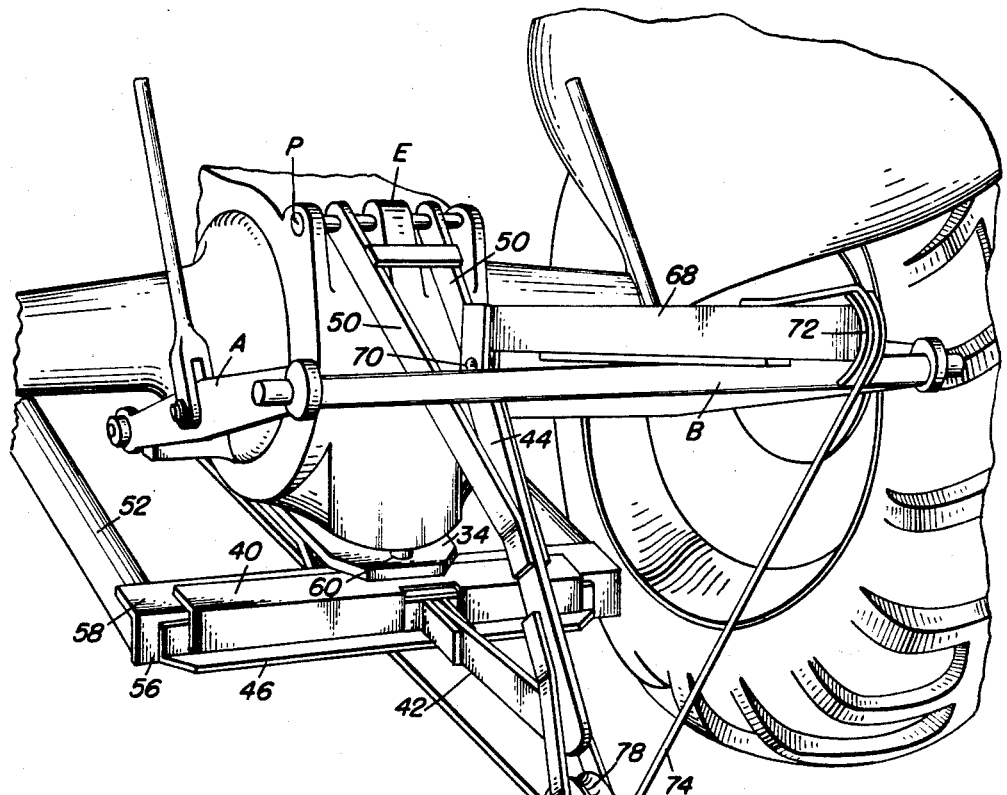
Figure 4 is a fragmentary perspective view of the rear of a tractor on which the present invention is mounted to show the rear mounting assembly.
Figure 7:
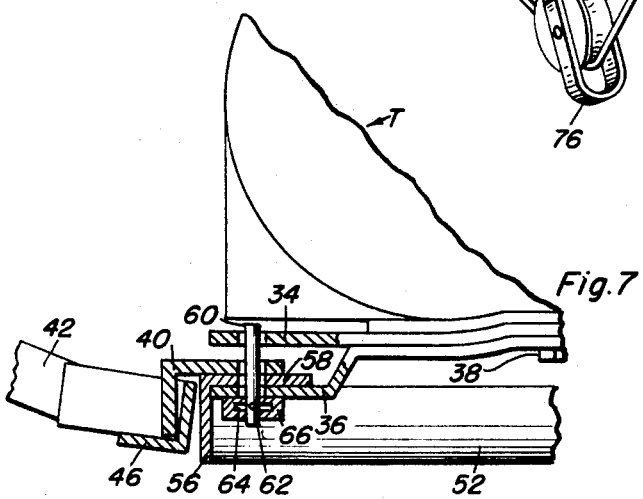
Figure 7 is a detail vertical sectional view showing the manner in which the rear mounting assembly is applied to the rear of a tractor.

The rear mounting assembly, designated by the numeral 12 and disposed at the rear of the tractor T as shown best in Figures 4 and 7 of the drawings, includes a pair of channel forming plates 34 and 36 whose forward ends are secured together and to the tractor by a fastening bolt 38. The rear offset end of the plate 36 is formed with an opening that registers with an opening in the rear end of the plate 34.

An angle iron member 40 extends transversely of the tractor and its horizontal flanged portion enters the channel formed by the plates 34 and 36. The horizontal flanged portion of the angle iron member 40 is formed with an opening that registers with the openings in the plates 34 and 36.

The lower end 42 of a substantially V-shaped frame member 44 is fixed medially the ends of an angle iron bar 46 whose vertical flange 48 extends under the vertical flange of the member 40. The upper end of the V-shaped frame member 44 supports a pair of upwardly and forwardly diverging arms 50 whose upper ends are secured to ears E on the rear of the tractor T by a horizontal pin P.

Blade supporting and lifting means

The blade supporting and lifting means, indicated by the numeral 14, consists of a pair of elongated side beams 52 whose forward ends support a blade 54 that is disposed forwardly of the front frame 10. An angle iron crossbar 56 is fixed by welding or the like to the rear ends of the beams 52 and the horizontal flange 58 of the crossbar 56 extends into the channel formed by the plates 34 and 36 beneath the horizontal flanged portion of the member 40. The horizontal flanged portion of the cross-bar 56 is formed with an opening that registers with the openings in the plates 34, 36 and the horizontal flanged portion of the member 40. The horizontal flange portion of member 40 is secured to the horizontal flange portion of member 56 by any suitable means to retain the members 40 and 56 in fixed position relative to one another.

A vertical pin 60 extends upwardly through the openings in the plates 34, 36 and the member 40 and crossbar 56. The lower end of the pin 60 supports a laterally projecting locking pin 62 that is received in a bayonet slot 64 in a pin seat 66 fixed to the cross-bar 56.

A vertically swingable member or arm 68 is pivoted, as at 70, to the upper end of the V-shaped frame member 44. The outer and rear end of the arm 68 supports a concavo-convexed plate 72. The rear end of a flexible element or cable 74 is fixed, by welding or the like to the arm 68, and the forward end of the cable 74 is secured to the central and upper portion of the blade 54.

The end portions of a U-shaped bracket 76 are fixed to the V-shaped frame member 44 and supports a pulley 78 over which the cable 74 is trained. The cable 74 is also trained under the pulley 32 and over the pulley 30.

The lift arms A of the tractor T support the usual crossbar B that underlies the arm 68 and move specifically a wear plate 80 carried by the undersurface of the arm 68.

Side beam stabilizer

The forward ends of the side beams 52 support vertical sleeves 82 in which are suitably fixed the lower ends of a pair of uprights 84 that are received between the corners formed by the member 16 and arms 18 and 20 of the front frame to prevent side sway or lateral movement of the beams 52.

Figure 2:
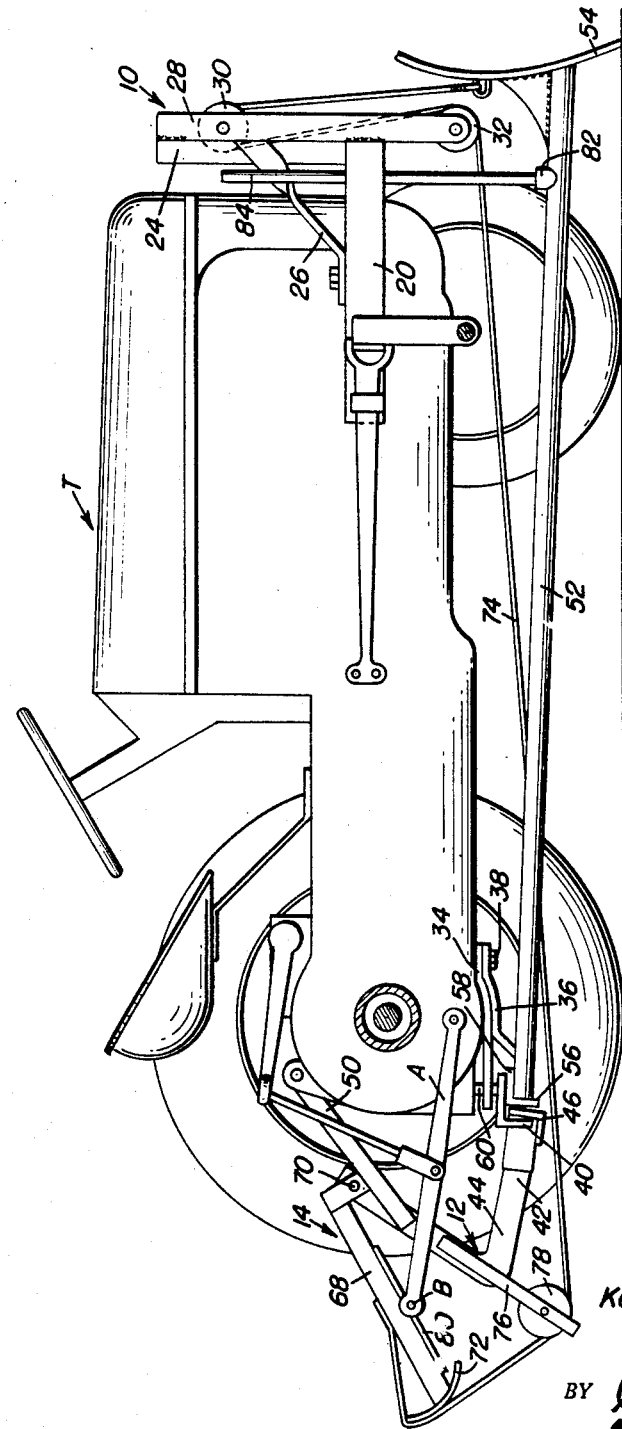
Figure 2 is a side elevational view of the present invention and showing the same mounted on a tractor.
Figure 3:
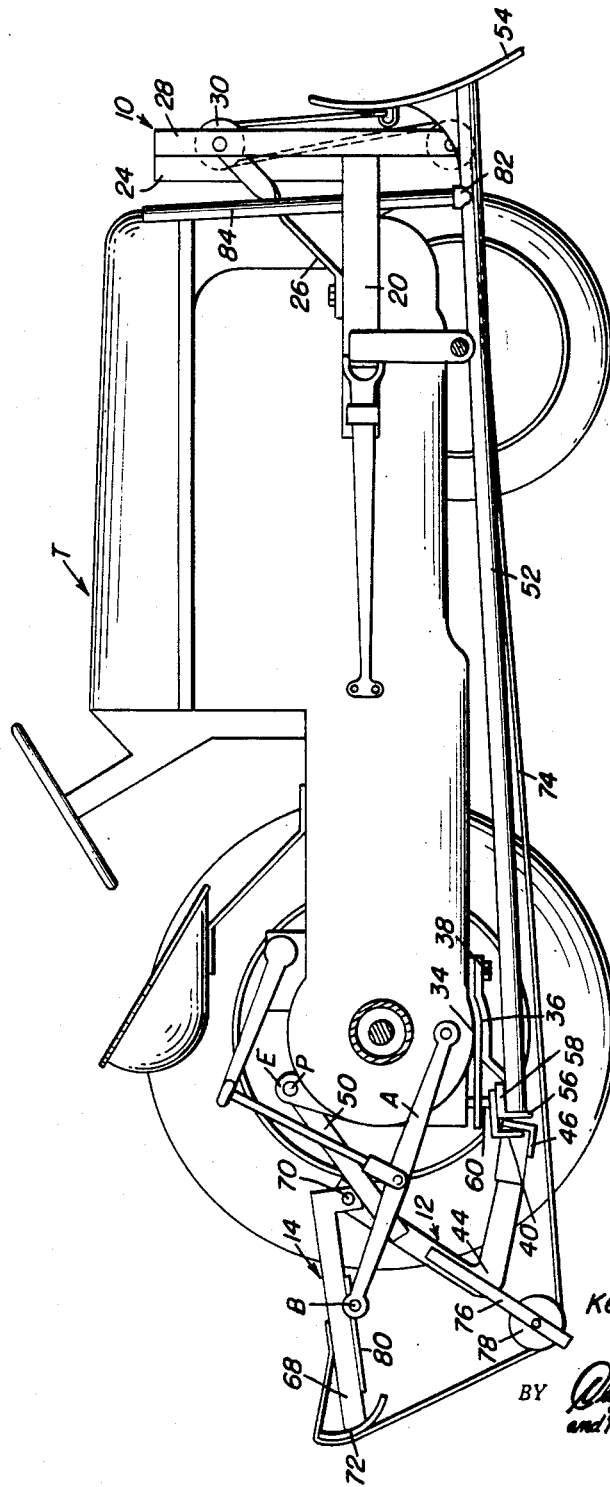
Figure 3 is a view similar to Figure 2 but showing the blade and side beams raised.

In practical use of the present invention, the side beams 52 and the blade 54 are raised as shown in Figure 3 of the drawings. In order to lower the blade 54 for use, the lift mechanism, including the arms A, is lowered and the arm 68 swings downwardly so that the cable 74 will become slack and the forward ends of beams 52 and the blade 54 will move downwardly as illustrated in Figure 2.

The lower ends of the uprights 84 are threaded in the sleeves 82 and are readily removed from the sleeves to permit removal of the device from the tractor.

The cross-bar 56, that rocks on the plate 36 as the beams 52 are raised and lowered, is removed from the plates 34, 36 by manual removal of the pin 60, after the frame member 44 is removed from the tractor upon withdrawal of the pin P. The member 40 is fixed by welding or the like to the cross-bar 56 and is removed with the cross-bar 56 and beams 52. Further, the member 40 is centrally notched to accommodate the lower end 42 of the frame member 44. The openings in the plates 34, 36, the member 40 and the horizontal flange 58 of the cross-bar 56 are sufficiently large to accommodate the pin 60 and permit rocking of the cross-bar 56 on the plate 36.

Having described the invention, what is claimed as new is:

1. In a tractor including a rear lift mechanism, a blade attachment comprising a front frame mounted at the forward end of the tractor, a pair of spaced parallel side beams disposed in vertical planes which are outside of and alongside of the tractor body, a blade secured to the forward ends of said beams, means attached to the rear ends of the beams and securing the rear ends of the beams to the rear of the tractor, a frame member at the rear end of the tractor, a vertically swinging member pivotally mounted on the frame member and actuated by the lift mechanism, and a flexible element attached to the swinging member and to the blade and slidably carried by the front frame and the rear frame for selectively raising and lowering the blade, said means including a pair of rigid angle iron members having vertical flanges which are spaced apart to define a downwardly facing channel, said frame member having an upstanding flange engaged in said channel.

2. In a tractor including a rear lift mechanism with a drawbar, a blade attachment comprising a front frame mounted at the forward end of the tractor, a pair of spaced parallel side beams disposed in vertical planes which are outside of and alongside of the tractor body, a blade secured to the forward ends of said beams, means attached to the rear ends of the beams and securing the rear ends of the beams to the rear of the tractor, a frame member mounted at the rear of the tractor, a vertically swinging member pivotally mounted on the frame member and including a portion overlying the lift mechanism and slidably engaged by said drawbar whereby the swinging member will be actuated by the lift mechanism, pulley means carried by said front frame and said frame member, and a flexible element terminally attached to said blade and said portion of said swinging member, said flexible element engaging said pulley means and extending beneath the body of the tractor, said means including a pair of rigid angle iron members having vertical flanges which are spaced apart to define a downwardly facing channel, said frame member having an upstanding flange engaged in said channel.

3. The combination of claim 1 and means carried by the forward ends of said beams and engaging the front frame to stabilize the beams and prevent lateral movement of the beams relative to the sides of the tractor.

4. The combination of claim 3 wherein said means carried by the forward ends of the beams includes a pair of uprights, said front frame having corner openings receiving said uprights.

5. In a tractor including a lift mechanism, a pair of elongated side beams disposed in vertical planes which are outside of and alongside of the tractor body, a blade secured to the forward ends of the beams, means attaching the rear ends of the beams to the rear end of the tractor for vertical movement of the beams at their rear ends, a front frame secured to the tractor above the forward ends of the beams, a rear frame member mounted at the rear of the tractor, a vertically swingable member pivotally carried by the frame member and actuated by the lift mechanism of the tractor, a pulley mounted on said rear frame member, another pulley mounted on said front frame and a cable trained over the pulleys and terminally attached to said vertically swingable member and said blade, said means including a pair of rigid angle iron members having vertical flanges which are spaced apart to define a downwardly facing channel, said frame member having an upstanding flange engaged in said channel.

6. In a tractor including a lift mechanism, a pair of elongated side beams disposed in vertical planes which are outside of and alongside of the tractor body, a blade secured to the forward ends of the beams, means attaching the rear ends of the beams to the rear end of the tractor for vertical movement of the beams at their rear ends, a front frame secured to the tractor above the forward ends of the beams, a rear frame member mounted at the rear of the tractor, a vertically swingable member pivotally carried by the frame member and actuated by the lift mechanism of the tractor, a pulley mounted on said rear frame member, another pulley mounted on said front frame, and a cable trained over the pulleys and terminally attached to said vertically swingable member and said blade, said means attaching the rear ends of said beams to the rear end of the tractor including a cross-bar having a horizontal flange, a mounting plate secured to the tractor and underlying the horizontal flange of said cross-bar, a pin secured to said cross-bar and extending upwardly through said horizontal flange and said mounting plate, an angle member paralleling said cross-bar and including a horizontal flanged portion overlying the horizontal flange of said cross-bar and receiving said pin, a substantially V-shaped frame member including first and second legs, means detachably securing the first leg of said frame member to the rear of the tractor, and means carried by the second leg of said frame member engaged under the angle member and retained between the angle member and the cross-bar.

7. In a tractor including a lift mechanism, a pair of elongated side beams disposed in vertical planes which are outside of and alongside of the tractor body, a blade secured to the forward ends of the beams, means attaching the rear ends of the beams to the rear end of the tractor for vertical movement of the beams at their rear ends, a front frame secured to the tractor above the forward ends of the beams, a rear frame member mounted at the rear of the tractor, a vertically swingable member pivotally mounted on said frame member and actuated by the lift mechanism of the tractor, a pulley mounted on said frame member, another pulley mounted on said front frame and a cable trained over the pulleys and terminally attached to said swingable member and said blade, said attaching means including n angle iron cross-bar extending between and terminally fixed to the rear ends of said beams, a pair of channel-forming plates secured to the rear of the tractor, said cross-bar including a horizontal flange received in the channel formed by said plates, an angle member having a horizontal flanged portion overlying the horizontal flange of said cross-bar and a vertical flanged portion paralleling the cross-bar, a vertical pin extending upwardly through the channel-forming plates and through the cross-bar and the angle member to limit rocking of the beams about their rear ends and to retain the beams relative to the channel-forming plates, said frame member being detachably secured to the rear of the tractor and including a flanged portion engaged under the vertical flanged portion of the angle member and between the angle member and the cross-bar.

8. A tractor attachment comprising a front frame including pulley means thereon, a pair of side beams having forward and rear ends, a blade secured to the forward ends of said beams, a rear mounting assembly for the rear ends of the beams and including a rockable member attached to the rear ends of the beams to permit raising and lowering of the forward ends of the beams, a rear frame member, and a vertically swingable member pivoted to the rear frame member and operatively connected to said blade through said pulley means for selectively raising and lowering the forward ends of said beams and said blade, said rockable member having a pair of horizontally spaced vertical flanges defining a channel, and said rear frame member having an upstanding flange extending upwardly into said channel.

9. A tractor attachment comprising a front frame including pulley means thereon, a pair of side beams having forward and rear ends, a blade secured to the forward ends of said beams, a rear mounting assembly for the rear ends of the beams and including a rockable member attached to the rear ends of the beams to permit raising and lowering of the forward ends of the beams, a rear frame member, a vertically swingable member pivoted to said rear frame member, a pulley on said rear frame member, and a cable terminally attached to said vertically swingable member and to said blade and extending about said pulley and said pulley means to permit raising of said blade and the forward ends of said beams during raising of said vertically swingable member, said rockable member having a pair of horizontally spaced vertical flanges defining a channel, and said rear frame member having an upstanding flange extending upwardly into said channel.

10. A tractor attachment comprising a front frame including pulley means thereon, a pair of side beams having forward and rear ends, a blade secured to the forward ends of said beams, a rear mounting assembly for the rear ends of the beams and including a rockable member attached to the rear ends of the beams to permit raising and lowering of the forward ends of the beams, a rear frame member, a vertically swingable member pivoted to said rear frame member and operatively connected to the forward ends of said beams through said pulley means for selectively raising and lowering the blade, and stabilizing means between said beams and said front frame, said rockable member having a pair of horizontally spaced vertical flanges defining a channel, and said rear frame member having an upstanding flange extending upwardly into said channel.

11. The combination of claim 10 wherein said stabilizing means includes an upright fixed to the forward end of each beam, said front frame including a vertical member and a pair of side arms secured to said vertical member to define corner openings receiving said uprights to confine said uprights relative to said front frame.

12. A tractor attachment comprising a front frame including pulley means thereon, a pair of side beams having forward and rear ends, a blade secured to the forward ends of said beams, a rear mounting assembly for the rear ends of the beams and including a rockable member attached to the rear ends of the beams to permit raising and lowering of the forward ends of the beams, a rear frame member, and a vertically swingable member pivoted to the rear frame member and operatively connected to said blade through said pulley means for selectively raising and lowering the forward ends of said beams and said blade, said rear mounting assembly including a pair of channel-forming plates, said rockable member comprising an angle iron cross-bar having a vertical flange received in the channel formed by said plates and rockable on one of the plates, said frame member being detachably secured to said channel-forming plates.

13. In a tractor including a rear lift mechanism, a front frame mounted on the forward end of the tractor in front of the tractor's radiator and distributing additional weight to the front wheels of the tractor, a rear mounting assembly mounted on the rear end of the tractor and distributing additional weight to the rear wheels of the tractor, a pair of side beams disposed in vertical planes outside of and alongside of the tractor body, a pair of angle iron bars fixed to the rear ends of said beams and rockably supported on the rear mounting assembly, the forward ends of said beams extending beneath and forwardly of said front frame, a blade supported on the forward ends of said beams, and means pivotally mounted on the rear of the tractor and slidably carried by the front frame and connected to the blade for raising the latter and including a cable, said means being engaged by said lift mechanism for selectively raising and lowering the blade, said angle iron bars including horizontally spaced vertical flanges defining a channel, and a guide for the cable including a frame member having a flange extending upwardly into the channel.

14. In a tractor including a rear lift mechanism, a front frame mounted on the forward end of the tractor in front of the tractor's radiator and distributing additional weight to the front wheels of the tractor, a rear mounting assembly mounted on the rear end of the tractor and distributing additional weight to the rear wheels of the tractor, a pair of side beams disposed in vertical planes outside of and alongside of the tractor body and including rear ends rockably supported on the rear mounting assembly, the forward ends of said beams extending beneath and forwardly of said front frame, a blade supported on the forward ends of said beams, a vertically swinging arm carried by said rear mounting assembly and slidably engaging over said lift mechanism, a single cable extending beneath the tractor and terminally attached to said blade and said arm, a pair of pulleys on said front frame receiving said cable and a rear pulley on said rear mounting assembly also receiving said cable, said rear mounting assembly including a frame member having an upper end pivoted to the rear end of the tractor and a lower end provided with an upstanding flange, and a pair of channel defining bars fixed to the rear ends of the beams and having spaced flanges between which the flange of said frame member is engaged.

References Cited in the file of this patent
UNITED STATES PATENTS

| Number | Name | Date |
|---|---|---|
| 1,861,731 | Wooldridge | June 7, 1932 |
| 2,213,635 | Miller et al. | Sept. 3, 1940 |
| 2,307,655 | Arps | Jan. 5, 1943 |
| 2,313,534 | Gledhill | Mar. 9, 1943 |
| 2,388,411 | Hicks | Nov. 6, 1945 |